(12) United States Patent
Shilane et al.

(10) Patent No.: US 9,471,245 B1
(45) Date of Patent: Oct. 18, 2016

(54) METHOD AND APPARATUS FOR TRANSFERRING MODIFIED DATA EFFICIENTLY

(71) Applicant: EMC Corporation, Hopkinton, MA (US)

(72) Inventors: Philip N. Shilane, Yardley, PA (US); Hyong Shim, Basking Ridge, NJ (US)

(73) Assignee: EMC Corporation, Hopkinton, MA (US)

( * ) Notice: Subject to any disclaimer, the term of this patent is extended or adjusted under 35 U.S.C. 154(b) by 365 days.

(21) Appl. No.: 13/665,881

(22) Filed: Oct. 31, 2012

(51) Int. Cl.
G06F 15/167 (2006.01)
G06F 3/06 (2006.01)
G06F 11/14 (2006.01)
G06F 11/20 (2006.01)

(52) U.S. Cl.
CPC ........... *G06F 3/065* (2013.01); *G06F 11/1402* (2013.01); *G06F 11/2056* (2013.01)

(58) Field of Classification Search
CPC ........... G06F 11/1451; G06F 2201/84; G06F 11/2056; G06F 11/1402; G06F 3/065
USPC .......................... 709/214; 711/162, 111, 112
See application file for complete search history.

(56) References Cited

U.S. PATENT DOCUMENTS

| 7,054,790 B1* | 5/2006 | Rich ............................. 702/186 |
| 7,284,019 B2 | 10/2007 | Adkins et al. |
| 7,739,677 B1 | 6/2010 | Kekre et al. |
| 8,122,158 B1* | 2/2012 | Kudva et al. ...................... 710/7 |
| 8,732,417 B1* | 5/2014 | Stringham .................... 711/162 |
| 2002/0124132 A1* | 9/2002 | Haines et al. ................. 711/112 |
| 2007/0079089 A1 | 4/2007 | Ohran et al. |
| 2008/0082593 A1 | 4/2008 | Komarov et al. |
| 2008/0208929 A1* | 8/2008 | Phillipi ......................... 707/204 |
| 2008/0307160 A1 | 12/2008 | Humlicek |
| 2009/0167871 A1 | 7/2009 | Usui |
| 2012/0278569 A1 | 11/2012 | Kawakami et al. |
| 2012/0311246 A1 | 12/2012 | McWilliams et al. |
| 2014/0082310 A1 | 3/2014 | Nakajima |

OTHER PUBLICATIONS

Non-Final Office Action, U.S. Appl. No. 13/665,885, dated Oct. 3, 2014, 18 pages.
Non-Final Office Action, U.S. Appl. No. 13/665,884, dated Dec. 11, 2014, 14 pages.
Final Office Action, U.S. Appl. No. 13/665,884, dated Apr. 3, 2015, 17 pages.
Final Office Action, U.S. Appl. No. 13/665,885, dated Mar. 23, 2015, 22 pages.

* cited by examiner

*Primary Examiner* — Glenton B Burgess
*Assistant Examiner* — Tan Doan
(74) *Attorney, Agent, or Firm* — Blakely, Sokoloff, Taylor & Zafman LLP (57) ABSTRACT

Techniques for transferring modified data with efficiency are described herein. According to one embodiment, the method starts with analyzing host write data to determine a host write pattern of a host writing to sectors at a primary storage, and then a data block size and a backup interval are determined based on at least one of the host write pattern, wherein a data block includes a number of sectors that is determined based on the host write pattern, and known characteristics of transferring dirty data blocks of the primary storage, wherein a dirty data block includes at least one sector that has been changed from a previous backup. Then dirty data blocks are transferred from the primary storage to a secondary storage as part of a backup.

24 Claims, 9 Drawing Sheets

METHOD AND APPARATUS FOR TRANSFERRING MODIFIED DATA EFFICIENTLY

CROSS-REFERENCE TO RELATED APPLICATIONS

This application is related to co-pending U.S. patent application Ser. No. 13/665,884, entitled "Method and Apparatus for Reducing Overheads of Primary Storage by Transferring Modified Data," filed Oct. 31, 2012, and co-pending U.S. patent application Ser. No. 13/665,885, entitled "Method and Apparatus for Reducing Overheads of Primary Storage by Transferring Modified Data in an Out-of-Order Manner," filed Oct. 31, 2012, which are incorporated by reference herein in its entirety.

FIELD

Embodiments of the present invention relate generally to data storage systems. More particularly, embodiments of the invention relate to incremental data backup from one storage system to another storage system.

BACKGROUND

Data storage is a critical component for computing. In a computing device, there is a storage area in the system to store data for access by the operating system and applications. In a distributed environment, additional data storage may be a separate device that the computing device has access to for regular operations. This kind of data storage is generally referred to as a primary storage, in contrast with a secondary storage, where computing devices also have access to but generally used for backing up. For data protection purposes, it is important to make regular copies of data from a primary storage to a secondary storage. While early backup strategies created complete (full) backups periodically, an alternate technique is to transfer only the incrementally modified data. By stitching together a newly modified data with a previous complete copy on the secondary storage, a new full backup can be reconstructed. This kind of backup is referred to as incremental backup.

A primary storage plays a central role in an incremental backup. The primary storage receives write requests from computing devices, and it writes data to its storage area. The primary storage also interacts with a secondary storage to transfer the incrementally modified data. The efficiency of the primary storage in data transfer is essential to improve efficiency of an incremental data backup.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. A dataset is a collection of data that is stored in a storage space in a variety of formats. In some embodiments, a storage space is a sector-based system, where sectors are the basic storage units. In some embodiments, a number of sectors makes up a data block, or blocks, and a number of blocks makes a logical unit (that are identified by a LUN, Logical Unit Number). A storage space may contain a number of logical units. A dataset may be a collection of sectors, blocks, logical units, or a combination thereof. Note the terms "data block" and "block" are used interchangeably within the specification. Also note that the size of blocks, i.e., the number of sectors aggregated to form a block, may be configurable and updatable within a primary storage.

According to some embodiments, a host is a computing device that is communicatively coupled with a primary storage. Both the host and the primary storage are communicatively coupled with a backup application server and a secondary storage over a network (e.g., the Internet, a storage network), where the backup application server coordinates backup from the primary storage to the secondary storage. The secondary storage may be a backup storage, a replica of the primary storage, an archival storage system, or a snapshot repository of the primary storage. The backup storage may be a deduplicating backup storage in some embodiments. In an incremental backup, only datasets that have changed from a previous backup will be transferred to the secondary storage. The changed datasets are referred to as "dirty datasets." Similarly changed sectors and changed blocks are referred to as "dirty sectors" and "dirty blocks," respectively. In contrast, unchanged sectors/blocks are referred to as "normal" sectors/blocks. In a primary storage, a host reads from or writes to sectors of the primary storage. Yet an incremental backup of the primary storage may transfer datasets not in the unit of dirty sectors, but in the unit of dirty blocks, where each dirty block includes a number of sectors for the incremental backup. Thus the primary storage may interact with the host in the unit of sectors (to coordinate reading and writing by the host) yet interact with the secondary storage in the unit of blocks (to transfer data for incremental backups) at the same time, for example, via separate threads in parallel.

According to some embodiments, a primary storage analyzes host writes to sectors at the primary storage to determine a host write pattern of a host. In this specification, host writes, storage writes, or writes are used interchangeably to refer to writing to a primary storage by a host or hosts. The primary storage may categorize the host write pattern as either sequential, random, or neither (which is referred to as default in this specification). In one embodiment, the sequentiality determination is based on a measurement of the size of consecutive sectors written by a host after the host seeks to a random sector. In one embodiment, the measurement is a numeric number, e.g., the average sequential write per random seek formulated as: Sequentiality Value=(consecutive dirty sectors*sector size)/number of non-consecutive seeks. When the measurement is above a first threshold, a host writing is deemed sequential, and the primary storage will consider using a first block size (e.g., a larger block size) so that more consecutive sectors will form a dirty block for transferring to the secondary storage. When the measurement is below a second threshold that is not higher than the first threshold, the host writing is deemed random, and the primary storage will consider using a second block size (e.g., a smaller block size) so that fewer sectors are in a block and therefore, fewer clean sectors are transferred to secondary storage. The first threshold and the second threshold may not be a same value, when the thresholds are not the same and the sequentiality value is between the two thresholds, the primary storage will consider using a default block size to form dirty blocks. After dirty blocks are formed, the dirty blocks are then transferred from the primary storage to the secondary storage.

According to some embodiments, during or after dirty blocks are transferred from a primary storage to a secondary storage, characteristics of the transfer are collected at the primary storage. Data transfer for incremental backup is based on dirty blocks, and a block is considered dirty even if only one sector within the block is dirty. Thus data transfer may transfer large amount of data (e.g., a large number of dirty blocks) but only transfer small amount of data that is actually dirty for an incremental backup at the secondary storage (e.g., only small number of dirty sectors are within the transferred dirty blocks). In that case, the transfer efficiency is low. The characteristics of the transfer may be used to spot the efficiency issue and make adjustment for future incremental backups. The collected characteristics may include a total amount of transferred data within an incremental backup, a percentage of dirty sectors of the transferred data, and a total amount of transferred data within a time period. The primary storage system may adjust data block size and backup interval to improve transfer efficiency for future incremental backups. For example, if the total amount of transferred data within an incremental backup is low, the primary storage system may increase the duration between two incremental backups in the future, thus more sectors are written during the prolonged duration (thus become dirty and in need of backup). For another example, if the percentage of dirty sectors of the transferred data is low, the primary storage may reduce the data block size in the future, thus fewer sectors are contained within a data block and the percentage of the dirty sectors within transferred blocks increases. In some embodiments, both the data block size and the backup interval may be adjusted at the same time to increase transfer efficiency for future incremental backups. The characteristics of data transfer under the new data block size and backup interval are collected to update or substitute existing characteristics and the new data is then analyzed so that further adjustment can be made for future incremental backups.

System Configuration

Figure 1:
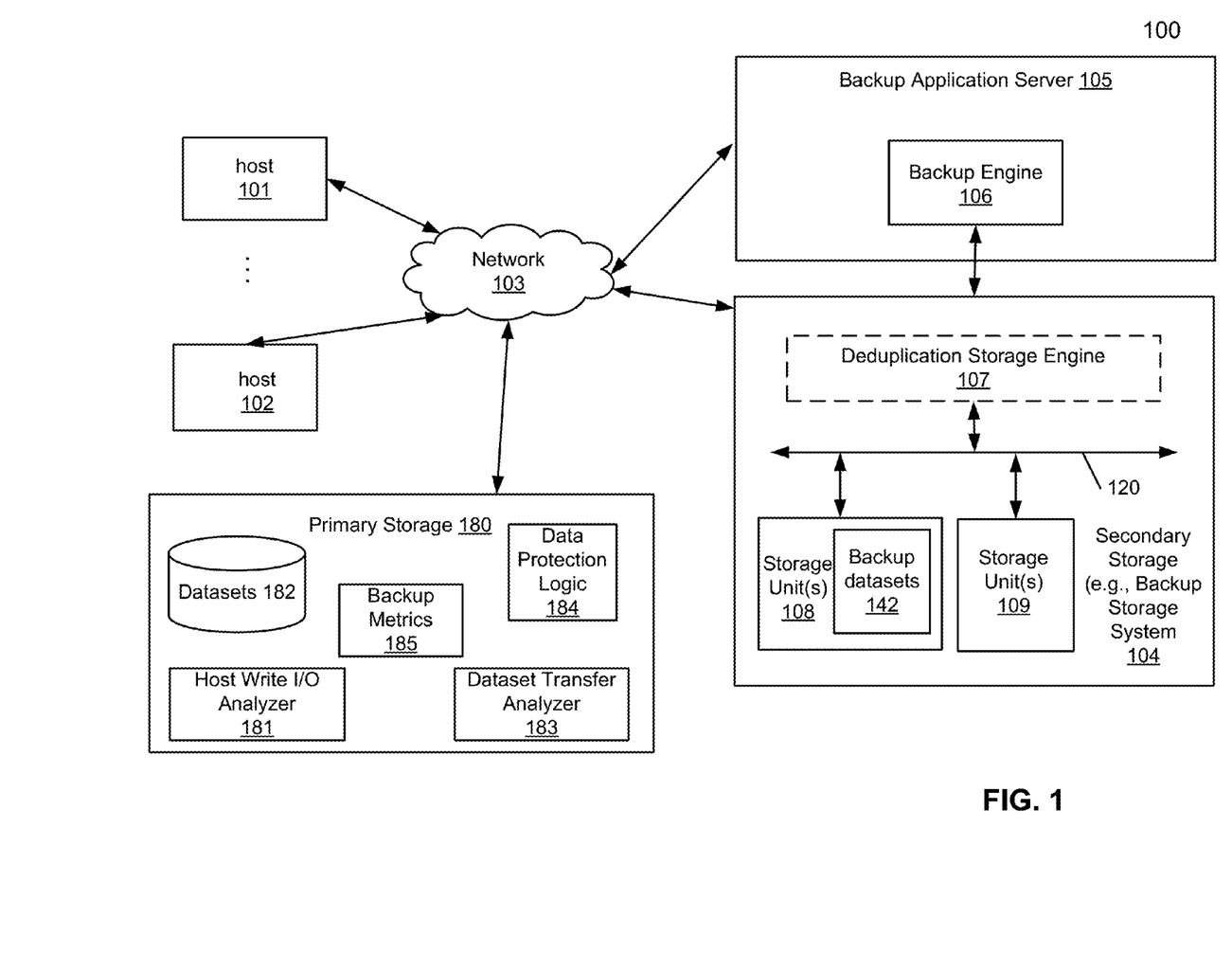
FIG. 1 is a block diagram illustrating a system for backup according to one embodiment of the invention.

FIG. 1 is a block diagram illustrating a system for backup according to one embodiment of the invention. Referring to FIG. 1, system 100 includes, but is not limited to, one or more hosts 101-102 communicatively coupled to a secondary storage (e.g., backup storage system 104), backup application server 105 and primary storage 180 over network 103. Hosts 101-102 may be any type of hosts such as a server, a personal computer (e.g., desktops, laptops, and tablets), a "thin" client, a personal digital assistant (PDA), a Web enabled system, a gaming device, a media player, or a mobile phone (e.g., Smartphone), etc. Network 103 may be any type of network such as a local area network (LAN), a wide area network (WAN) such as Internet, a corporate intranet, a metropolitan area network (MAN), a storage area network (SAN), a bus, or a combination thereof, wired and/or wireless.

Backup storage system 104 may include any type of server or cluster of servers. For example, backup storage system 104 may be a storage server used for any of various different purposes, such as to provide multiple users with access to shared data and/or to back up mission critical data. Backup storage system 104 may be, for example, a file server (e.g., an appliance used to provide network attached storage (NAS) capability), a block-based storage server (e.g., used to provide storage area network (SAN) capability), a unified storage device (e.g., one which combines NAS and SAN capabilities), a nearline storage device, a direct attached storage (DAS) device, a tape backup device, or essentially any other type of data storage device. Backup storage system 104 may have a distributed architecture, or all of its components may be integrated into a single unit. Backup storage system 104 may be implemented as part of an archive and/or backup storage system such as a de-duplication storage system available from EMC® Corporation of Hopkinton, Mass.

In one embodiment, backup application server 105 includes, but not limited to, a backup engine 106. Backup application server 105 coordinates with backup storage system 104, primary storage 180, and hosts 101-102 to run various backup operations. Backup engine 106 may perform both backup and restore functions.

In one embodiment, backup storage system 104 may include, but is not limited to, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 108-109 may be organized into one or more volumes of Redundant Array of Inexpensive Disks (RAID). Backup datasets 142 represent datasets stored in storage units 108. Note that in one embodiment, backup application server 105 and backup storage system 104 are integrated into one single system.

In response to a dataset to be stored in storage units 108-109, optional deduplication storage engine 107 is configured to segment the dataset into multiple segments (also referred to as data chunks or simply chunks) according to a variety of segmentation policies or rules. Deduplication storage engine 107 only stores a segment in a storage unit if the segment has not been previously stored in the storage unit. In the event that a segment has been previously stored, metadata stores information enabling the reconstruction of a dataset using the previously stored segment. As a result, segments of datasets are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a segment plus a difference; subsegmenting: a list of subsegments or references to subsegments, etc.). In one embodiment, different storage units may use different compression methods (e.g., main or active storage unit from other storage units, one storage unit from another storage unit, etc.).

The metadata may be stored in at least some of storage units 108-109, such that datasets can be accessed independent of another storage unit. Metadata of each storage unit includes enough information to provide access to the datasets it contains. When an active storage unit fails, metadata contained in another storage unit may be utilized to recover the active storage unit. When one storage unit is unavailable (e.g., the storage unit has failed, or is being upgraded, etc.), the system remains up to provide access to any dataset not stored in the failed storage unit. When a dataset is deleted, the metadata associated with the datasets in the system is updated to reflect that the dataset has been deleted.

In one embodiment, the metadata information includes a dataset identifier, a storage unit where the segments associated with the dataset identifier are stored, reconstruction information for the dataset using the segments, and any other appropriate metadata information. In one embodiment, a copy of the metadata is stored on a storage unit for datasets stored on a storage unit so that datasets that are stored on the storage unit can be accessed using only the information stored on the storage unit. In one embodiment, a main set of metadata information can be reconstructed by using information of other storage units associated with the backup storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units).

In one embodiment, the backup storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Datasets are periodically moved among the tiers based on data management policies to achieve a cost-effective match to the current storage requirements of the datasets. For example, a dataset may initially be stored in a tier of storage that offers high performance for reads and writes. As the dataset ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, backup engine 106 is configured to back up data from hosts 101-102 and to store the backed-up data in one or more of storage units 108 of backup storage system 104, where the data may be deduplicated by deduplication storage engine 107. In this example, a user (e.g., an administrator) initiates a backup request, directly or through a backup schedule, of primary storage 180.

Primary storage 180 may include any type of server or cluster of servers (e.g., remote servers). For example, primary storage 180 may be a storage server used for any of various different purposes, such as to provide multiple users with access to shared data and/or to back up mission critical data. Primary storage 180 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, or essentially any other type of data storage device. Primary storage 180 may have a distributed architecture, or all of its components may be integrated into a single unit. Primary storage 180 may be implemented as part of a storage system available from EMC® Corporation of Hopkinton, Mass.

Primary storage 180 contains datasets 182, which represent the data stored in the primary storage. Datasets 182 may be stored across a number of logical units, and each logical unit is identified by a logical unit number (LUN). Each logical unit may contain a number of sectors. A number of consecutive sectors may be aggregated to form a block for backup data transfer. Primary storage 180 may also contain host write Input/output (I/O) analyzer 181 that analyzes writes to primary storage 180 from hosts. In one embodiment, one host I/O analyzer is dedicated to a single host. In another embodiment, one host I/O analyzer analyzes host writes from all hosts to the primary storage. Note host write I/O analyzer 181 does not have to be part of primary storage 180. It can be a component external to primary storage 180 and still analyzes host I/O access pattern. In one embodiment, there is no host write I/O analyzer 181 in the system and the function is served by an administrator based on the known I/O characteristics of the applications that write to primary storage 180. Primary storage 180 also contains dataset transfer analyzer 183 to analyze dataset transfers from previous backups (e.g., the last incremental backup). The analyzed data from host write I/O analyzer 181 and dataset transfer analyzer 183 are fed to backup metrics 185. Backup metrics 185 includes performance metrics for transfer characteristics of past incremental backup(s) and sequentiality of host write I/O pattern. Based on the metrics, backup metrics 185 may determine a proper block size and backup interval combination. The determination then can be given to data protection logic 184, which uses the information to adjust block size and backup interval to increase backup efficiency.

Illustration of Host Write I/O Patterns

Figure 2:
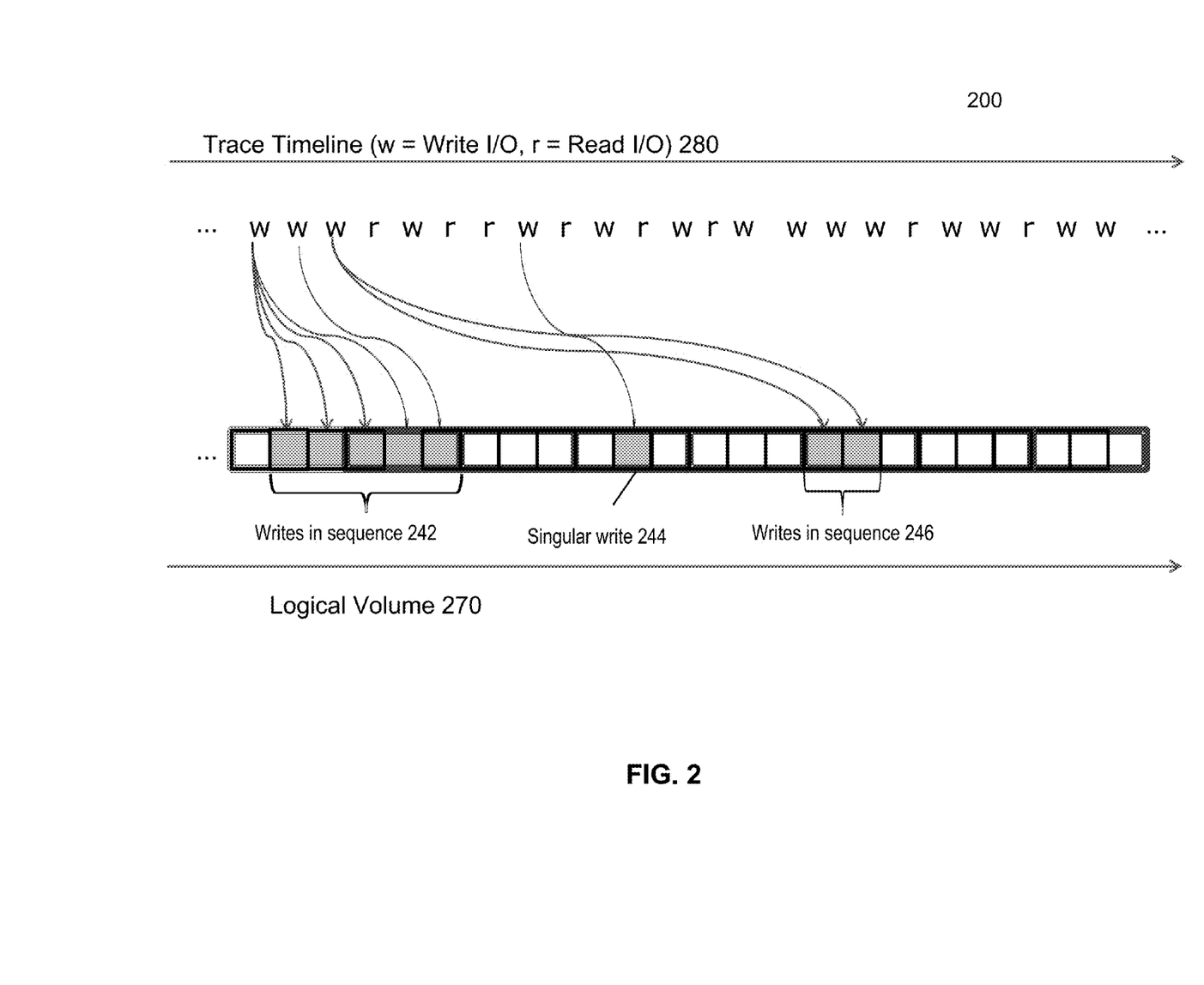
FIG. 2 is a block diagram illustrating a host write I/O pattern according to one embodiment of the invention.

FIG. 2 is a block diagram illustrating a host write I/O pattern according to one embodiment of the invention. Trace timeline 280 illustrates timeline of backups of dataset 182 of primary storage 180 to backup storage system 104 of FIG. 1. A list of write and read operations by a host (e.g., host 102 in FIG. 1) to primary storage 180 is shown, where a "w" represents a write input/output (I/O) operation and an "r" represents a read I/O operation. While FIG. 2 shows that "w" and "r" occur at a roughly equal interval, the showing is for simplicity of illustration. Read I/O and write I/O may occur at a non-even pace. FIG. 2 shows a stream of squares and each square represents a sector of logical volume 270. The writes to a sector results in value change of the sector. The changed sectors are dirty sectors that need to be transferred to backup storage system 104. The changed sectors are blacked out as indicated in FIG. 2. A write can be in sequence, i.e., a write updates a number of sequential sectors. For example, references 242 and 246 are writes in sequences as at reference 242 and reference 246, 5 and 2 sequential sectors are written respectively. Note the 5 sequential written sectors are not from the same write I/O—the first 4 written sectors are written by one write I/O and the last written sector is written by another. A write can also be singular. For example, reference 244 is a singular write as only a single sector is written for the write operation. When a host write I/O pattern contains many sequential sectors, an associated primary storage may be able to increase block sizes so that more sectors can be aggregated to form dirty blocks for incremental backup. On the other hand, when a host write I/O pattern contains only sporadic sequential sectors, the associated primary storage may need to reduce block sizes so that few unchanged ("normal") sectors will be aggregated with dirty sectors and transferred to a backup storage system. In addition, the associate primary storage may need to increase backup frequency by reducing its backup interval so that sequential writes can be backed up in a timely manner and the total amount of data transfer in one incremental backup remains manageable.

In one embodiment, a sequentiality value is defined as average size of sequential writes per random seek. In one embodiment, the sequentiality value may be determined based on a number of consecutive writes to sectors, a sector size, and a number of seeks. In one particular embodiment, the sequentiality value is defined as: sequentiality value=(number of consecutive dirty sectors*sector size)/number of nonconsecutive seeks. A sequentiality value has a unit of sector size, such as kilobytes. Using FIG. 2 as an example, the portion of logical volume 270 has 3 seeks at references 242, 244, and 246 respectively. The number of consecutive dirty sectors is 5 [at reference 242]+1 [at reference 244]+2 [at reference 246]=8. Assuming a sector size of 512 bytes, the sequentiality value of host 102 is 8*512/3=1365.333 bytes≈1.37 KB. In this simplistic example, the sequentiality value appears to be low, and primary storage 180 may determine that the host write pattern is random and a lower block size and/or a shorter backup interval are desirable. On the other hand, if the sequentiality value is high, primary storage 180 may determine a higher block size and/or a longer backup interval are preferred. In one embodiment, sequentiality thresholds are utilized. The sequentiality thresholds may be associated with a particular primary storage system and/or a particular backup storage system. The thresholds include a sequential threshold that when a sequentiality value of a host write is over the sequential threshold, the host write is deemed "sequential," and a set or sets of predetermined block sizes and incremental backup intervals may be used for incremental backups from the particular primary storage for the associated host. The thresholds may also include a random threshold that when the sequentiality value of a host write is below the random threshold, the host write is deemed "random," and another set or sets of predetermined block sizes and incremental backup intervals will be used for incremental backup from the particular primary storage for the associated host. The sequential and random thresholds may not be the same value, and when the value is not the same, the range between the two thresholds is referred to as the "default," and another set or sets of predetermined block sizes and incremental backup intervals may be used. In one embodiment, a sequential threshold and a random threshold are defined as 128 KB and 8 KB respectively. Also note the importance of sequentiality value is on transfer efficiency of a primary storage, thus while backup storage 104 is used for illustration herein above, the primary storage may be communicatively coupled with other types of secondary storages and utilize embodiments of the invention. For example, replica of primary storage, archival, or snapshot repository of snapshots may utilize embodiments of sequentiality values, albeit different thresholds may be used depending on the characteristics of the secondary storage.

Illustration of Efficiency of Incremental Backup

Figure 3:
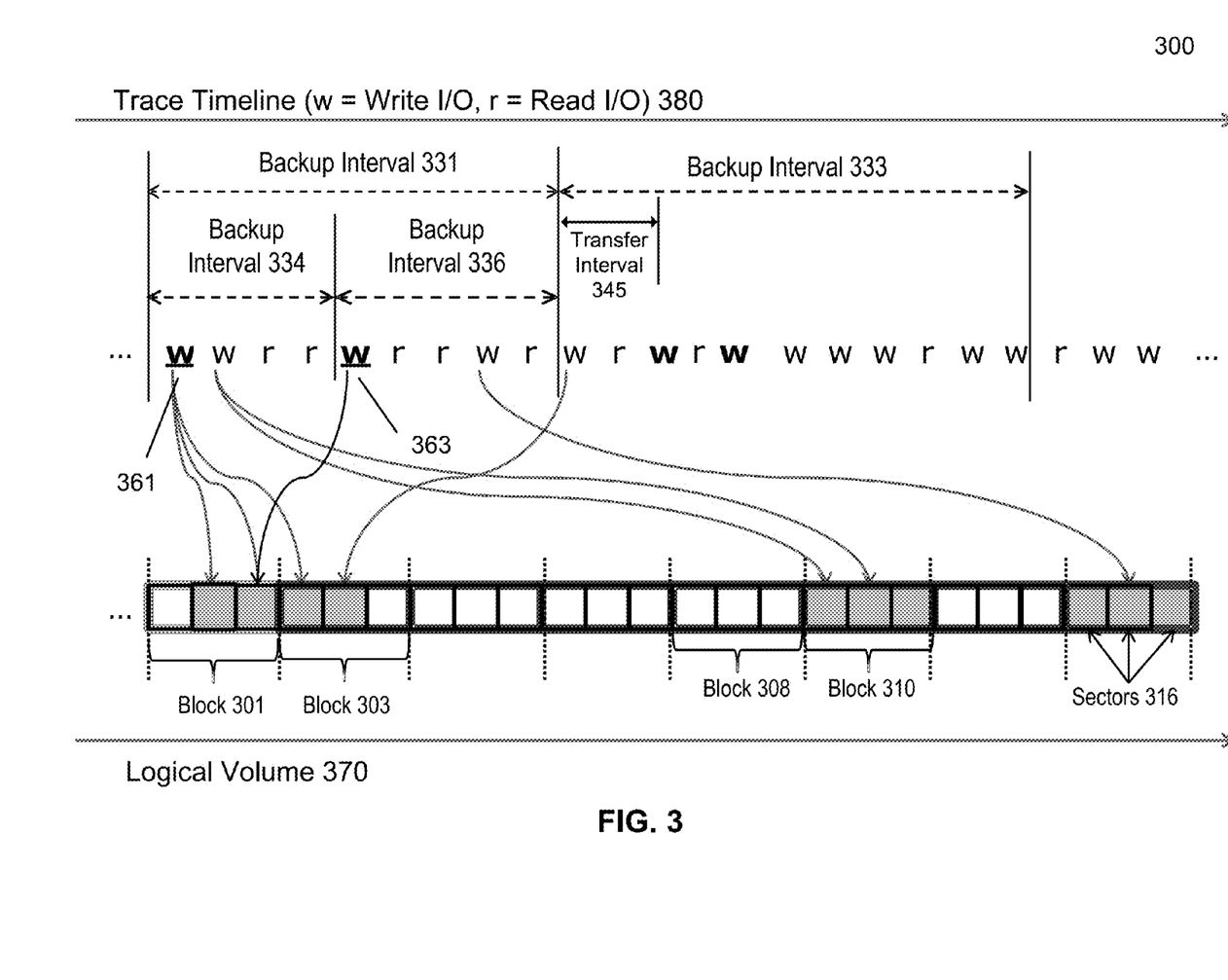
FIG. 3 is a block diagram illustrating dirty block transfer characteristics at different backup intervals according to one embodiment of the invention.

FIG. 3 is a block diagram illustrating dirty block transfer characteristics at different backup intervals according to one embodiment of the invention. System 300 is similar to system 200 in FIG. 2 and the same or similar references indicate elements or components having the same or similar functionalities. Differently from FIG. 2, sectors now have been aggregated to form blocks. As shown at reference 316, in this example, three sectors form one block. Some blocks are dirty (i.e., changed from a previous backup). For example, block 310 is dirty with all three sectors of the block being dirty. Some blocks are normal (i.e., unchanged from a previous backup). For example, block 308 is normal. Others are dirty too, but not all sectors within the blocks are dirty. For example, blocks 301 and 303 each have only two sectors being dirty. As shown, backups are periodically performed, and backup intervals 331/333 and 334/336 are two embodiments of incremental backup intervals. An incremental backup may use a longer backup interval as shown in reference 331 and 333 or it may use a shorter backup interval as shown in references 334 and 336. Note that the write at reference 361 writes to two sectors in block 301 and one of the same sectors in block 301 is written later at reference 363. When an incremental backup uses the longer backup interval, block 301 is transferred only once at backup interval 331. The sector at block 301 is marked as dirty at the first write at reference 361. When the second write at reference 363 happens, the sector at block 301 remains in the dirty state. Thus when incremental backup interval 331 ends, it sees block 301 being dirty and transfers it to a secondary storage. The transfer starts at the end of backup interval 331; therefore, it overlaps with the starting of backup interval 333 as reference 345 shows. When an incremental backup uses the shorter backup interval, at backup interval 334, block 301 is transmitted once as block 301 is changed due to write at reference 361. Later at backup interval 336, block 301 is transmitted one more time as block 301 is changed again due to write at reference 363. Thus a longer backup interval may reduce the amount of data transferred for incremental backup with an identical host write I/O pattern. In other words, adjusting backup interval may affect transfer efficiency for incremental backups of a same host.

Figure 4A:
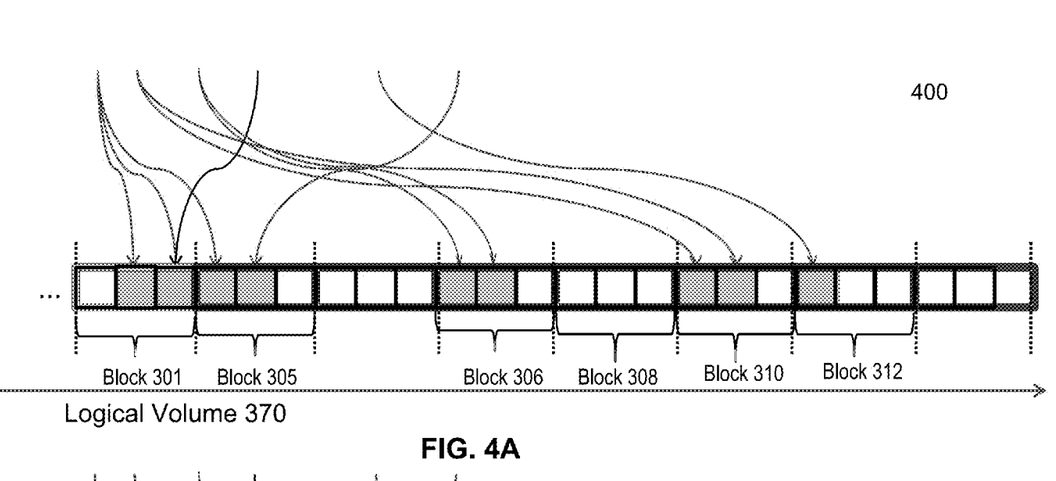
FIG. 4A-4B are block diagrams illustrating dirty block transfer characteristics at different block sizes according to one embodiment of the invention.
Figure 4B:
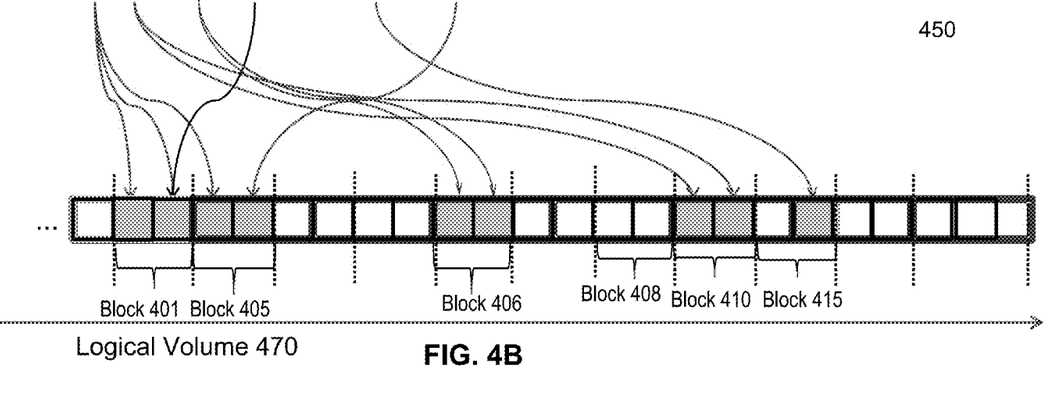

FIGS. 4A-4B are block diagrams illustrating dirty block transfer characteristics at different block sizes according to one embodiment of the invention. Systems 400 of FIG. 4A and 450 of FIG. 4B are similar to system 200 in FIG. 2 and the same or similar references indicate elements or components having the same or similar functionalities. The difference between systems 400 and 450 is that block sizes are different. In system 400, the block size is three, i.e., each block contains three sectors; while in system 450, the block size is two. As discussed herein above, a block is dirty and thus needs to be transferred for an incremental backup as long as there is one or more dirty sector within the block. Therefore, in system 400, blocks 301, 305, 306, 310, and 312 are transferred. Block 308 is not transferred as none of the sectors within block 308 is dirty. Similarly, in system 450, blocks 401, 405, 406, 410, and 415 are transferred. Thus in system 400, 5 [blocks]*3 [sectors within each block]=15 sectors are transferred for an incremental backup of the 9 changed sectors. Yet in system 450, only 5 [blocks] *2 [sectors within each block]=10 sectors are transferred for the backup of the same 9 changed sectors. Thus, even though logical volumes 370 and 470 have an identical dirty sector distribution, the amount of dataset transfer differs, and system 450, with a smaller block size, is more efficient—less data has been transferred than system 400. In other words, adjusting block sizes may affect transfer efficiency for incremental backup of a same host.

Embodiments of Incremental Backup

Figure 5:
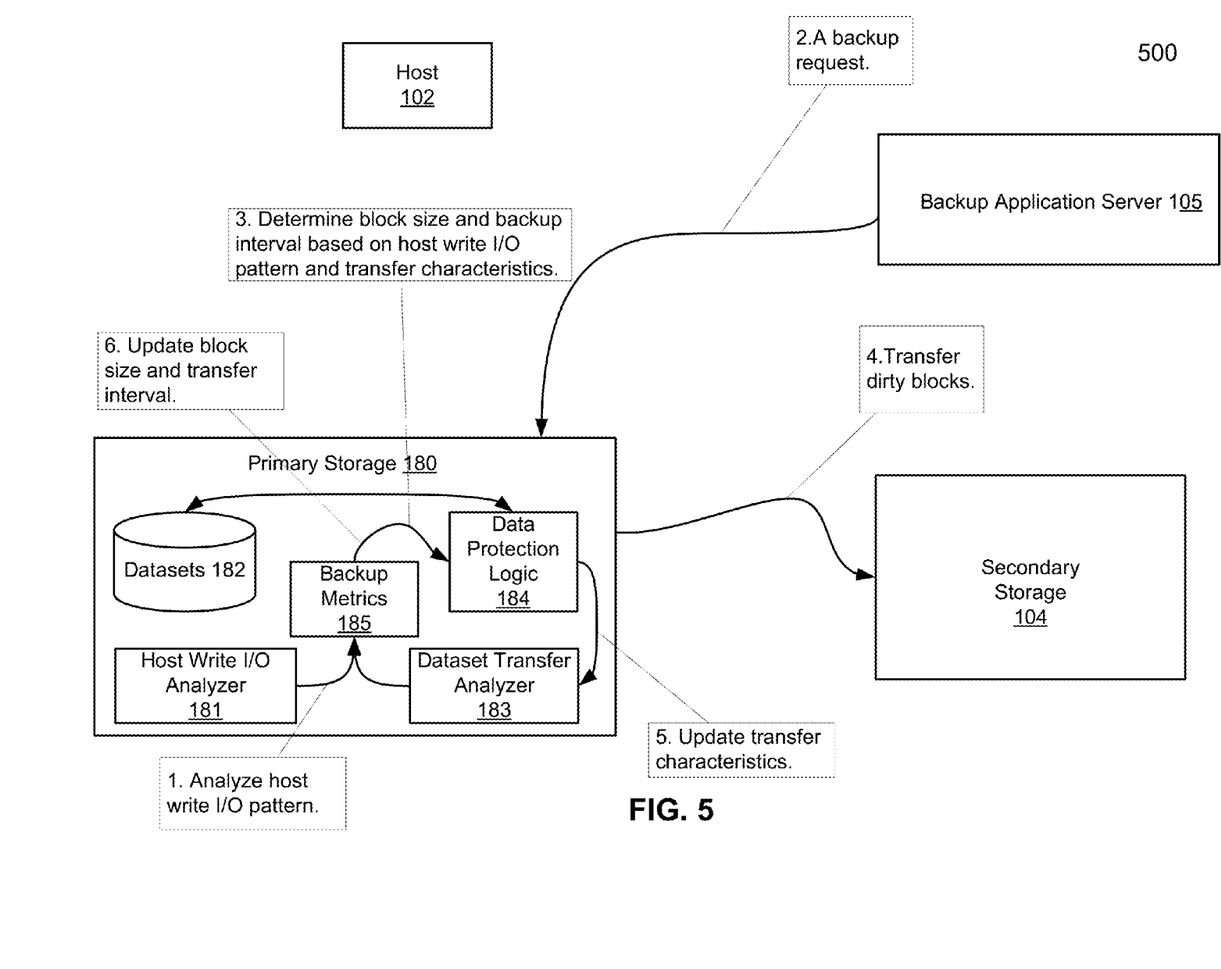
FIG. 5 is a block diagram illustrating an incremental backup process using host write I/O pattern and transfer characteristics according to one embodiment of the invention.

FIG. 5 is a block diagram illustrating an incremental backup process using host write I/O pattern and transfer characteristics according to one embodiment of the invention. Task boxes 1 to 7 illustrate the order in which operations are performed according to one embodiment of the invention. System 500 is similar to system 100 in FIG. 1 and the same or similar references indicate elements or components having the same or similar functionalities. The connectivity between various entities and modules within entities are omitted in FIG. 5 to leave space to discuss the incremental backup process more clearly. At task box 1, the process starts at host write I/O analyzer 181 analyzing host write I/O pattern. Primary storage 180 continues receiving write I/O from hosts associated with primary storage 180 (e.g., host 102). Host write I/O analyzer 181 continuously stores its analysis result to backup metrics 185 while a host writes to datasets 182.

At task box 2, a request for a backup is received at primary storage 180. In one embodiment, the request comes from a user directly through a user interface. In another embodiment, the request comes from secondary storage system 104 or primary storage 180 itself based on a backup schedule. Note in some embodiments, the user may request a full backup or an incremental backup, and primary storage 180 decides whether full datasets or changed datasets only are transferred (e.g., primary storage 180 may decide to transfer changed datasets only when the secondary storage has an earlier backup of the datasets and only changed datasets are needed to fully reconstruct the datasets at the secondary storage). After receiving the backup request, primary storage 180 performs task box 3. Backup metrics 185 checks host write I/O pattern and collected transfer characteristics of previous backups and determine a block size to use to aggregate dirty sectors into blocks and a backup interval for the next backup. In one embodiment, the host write I/O pattern determination involves calculating a sequentiality value of a host write I/O pattern. The calculated sequentiality value determines whether the host write I/O pattern is sequential, random, or default. In one embodiment, a set or sets of predetermined block sizes are mapped to sequential, random, and default host write I/O pattern at backup metrics 185 respectively. Backup metrics 185 also may receive transfer characteristics of one or more previous backups from dataset transfer analyzer 183. Transfer characteristics of a backup, in one embodiment, include a total amount of transferred data within an incremental backup, a percentage of dirty sectors of the transferred data, and/or a total amount of transferred data within a time period. The time period can vary, for example, ranging from 15 minutes to 24 hours, weekly, or even longer. Dataset transfer analyzer 183 provides the transfer characteristics to backup metrics 185. Based on host write I/O pattern determination and transfer characteristics of previous backups, backup 185 determines a block size to use for the incremental backup request and sends the determination to data protection logic 184. At task box 4, dirty blocks, each of which contains at least one dirty sector, are transferred to secondary storage system 104.

At task box 5, during or after dirty block transfer, dataset transfer analyzer 183 collects transfer characteristics and updates existing transfer characteristics. The updated data is then fed to backup metrics 185. At task box 6, backup metrics 185 determines whether or not to update block size and backup interval for future backups (e.g., the next backup). Note that not all modules are needed for an implementation of the invention and the adjustment to increase data transfer efficiency does not necessarily involve adjust both block size and incremental backup interval. In one embodiment, primary storage 180 changes block size based on host write I/O pattern and transfer characteristics after task box 3. The resized blocks are then transferred to secondary storage 104 at task box 4. The resizing can be done by merging smaller blocks into larger blocks for example. In some embodiments, only one of the block size and the incremental backup interval will be updated. In addition, the adjustment of block size and incremental backup interval may be limited by factors other than transfer efficiency. For example, a user may dictate that an incremental backup interval has to be shorter than a predetermined value so that a host's data are reliably backed up at a secondary storage system. Thus the determination of proper block size and backup interval by primary storage 180 may be controlled by factors other than incremental backup efficiency in some embodiments. Note task boxes 3 and 4 do not follow the sequence as illustrated in FIG. 5 in one embodiment, and determination of block size and backup interval at task box 3 may happen after data block transfer at task box 4. For example, when block resizing is not supported, the determination at task box 3 does not need to happen prior to data block transfer at task box 4.

In the embodiment illustrated in FIG. 5, a backup interval and a block size are updated regularly based on host write I/O pattern and data transfer characteristics. Backup metrics 185, host write I/O analyzer 181, dataset transfer analyzer 183, and data protection logic 184 are in a loop to seek efficient data transfers between primary storage 180 and secondary storage 104. These kinds of embodiments are referred to as "dynamic" models of efficient incremental backups. In some other embodiments, the backup interval and block size are not updated based on continuous feedback of transfer efficiency and host I/O write pattern analysis. Rather, the backup interval and block size are determined once based on transfer efficiency and host I/O write pattern. Later changes of transfer efficiency and host I/O write pattern does not affect the determined value. These kinds of embodiments are referred to as "static" models of efficient incremental backups.

Backup metrics 185 considers multiple factors of transfer characteristics in making block size and transfer interval determination. For example, a sequential I/O on a secondary storage system is more efficient than a random I/O. This means that it is generally more efficient to write large blocks to the secondary storage system. If small blocks are sequential, then they can be grouped at the secondary storage system into a consecutive write and be as efficient as a larger block. In general though, writing small blocks tends to cause more random I/O because of the finer grained tracking of changed sectors. As blocks become smaller (close to a sector size), transferred blocks tend to be more fully dirty. Yet when blocks become larger, some sectors are actually clean, so it is inefficient to use overly large blocks in terms of the amount of data transferred and written to secondary storage. About transfer interval determination, when there are short intervals between backups, a smaller number of sectors tend to be modified than for longer intervals between backups. The number of modified sectors grows less than linearly with time because there are periodic overwrites of the same sectors (as illustrated at references 361 and 363 at FIG. 3), and only the most recent value has to be transferred for a given backup period. This means that transferring data once per day may transfer less total data than transferring data four times per day but more than what is transferred during the first of the four backups. Backup metrics 185 makes its determination based on these findings and in a dynamic model, it adjusts block size and backup interval periodically with newly obtained data.

Figure 6:
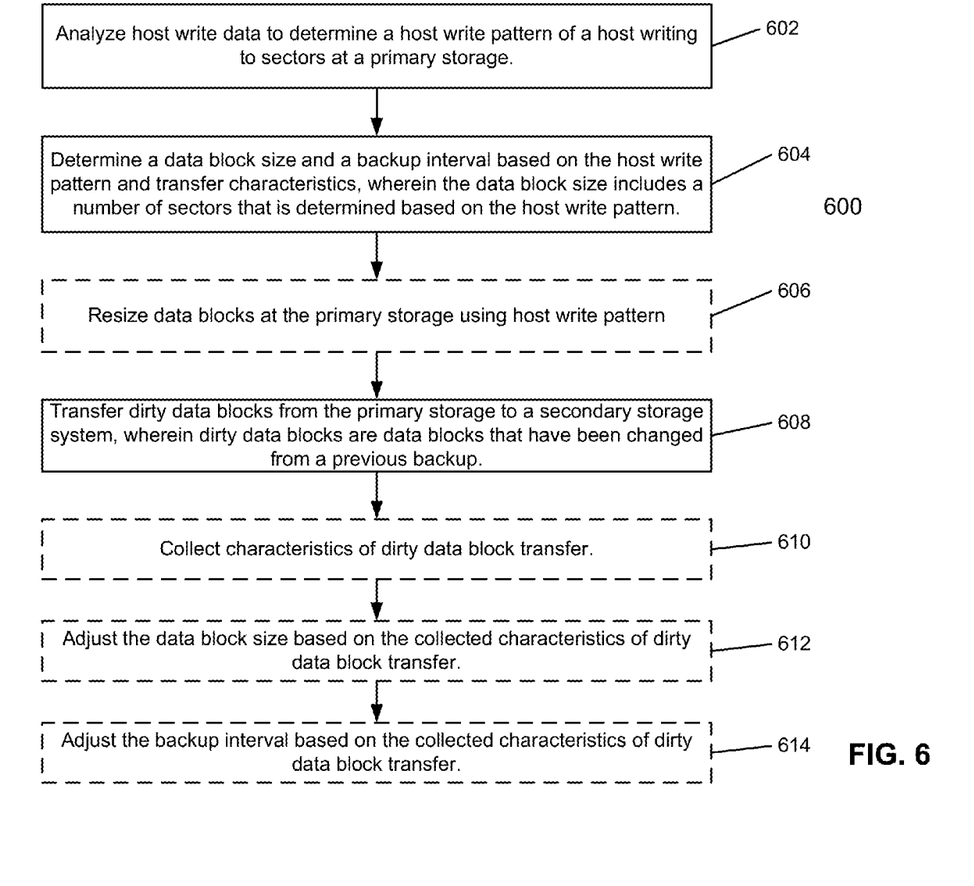
FIG. 6 is a flow diagram illustrating a method of incremental backup according to one embodiment of the invention.

FIG. 6 is a flow diagram illustrating a method of incremental backup according to one embodiment of the invention. The process may be implemented at primary storage 180. The process starts at reference 602, where host write data is analyzed to determine a host write pattern of a host writing to sectors at a primary storage. In one embodiment, the determination involves measuring sequentiality of host write pattern with a numeric value. In one embodiment, a sequentiality value is defined as an average size of sequential writes to sectors per random seek. In one embodiment, sequentiality value=(number of consecutive dirty sectors*sector size)/number of nonconsecutive seeks. The calculated sequentiality value is then compared to a predetermined sequential threshold and a predetermined random threshold. If the sequentiality value is higher than the predetermined sequential threshold, the host write pattern is deemed to be "sequential." If the sequentiality value is lower than the predetermined random threshold, the host write pattern is deemed to be "random." If the sequentiality and random threshold are not the same value, and the sequentiality value is within the gap, the host write pattern is deemed to be in the "default."

At reference 604, a data block size and a backup interval are determined based on the host write pattern and known transfer characteristics of data transfer from the primary storage to a secondary storage. The sequentiality value of the host write pattern and the resulting category of "sequential," "random," and "default" can be used to determine the data block size to aggregate consecutive dirty sectors in the next backup. At reference 606, optionally, data blocks may be resized based on the host write pattern and known transfer characteristics of dataset transfer. Then at reference 608, dirty data blocks are transferred from the primary storage to a secondary storage system. Optionally, characteristics of dirty data block transfer at reference 608 can be collected during the transfer or after the transfer is completed at reference 610. The characteristics of dirty data block transfer include a total amount of transferred data within an incremental backup, a percentage of dirty sectors of the transferred data, a total amount of transferred data within a time period, and an amount of input/output on the secondary storage. The percentage of dirty sectors of transferred data may be measured periodically or sampled using various standard sampling techniques. Sampling may be needed as measuring dirty sectors may require more memory than is available and sampling may provide a good enough estimate with less memory. Then at reference 612, the data block size can be adjusted based on the collected characteristics of dirty data transfer for future backups. Similarly, the backup interval can be adjusted based on the collected characteristics of dirty data transfer for future backups at reference 614.

Figure 7:
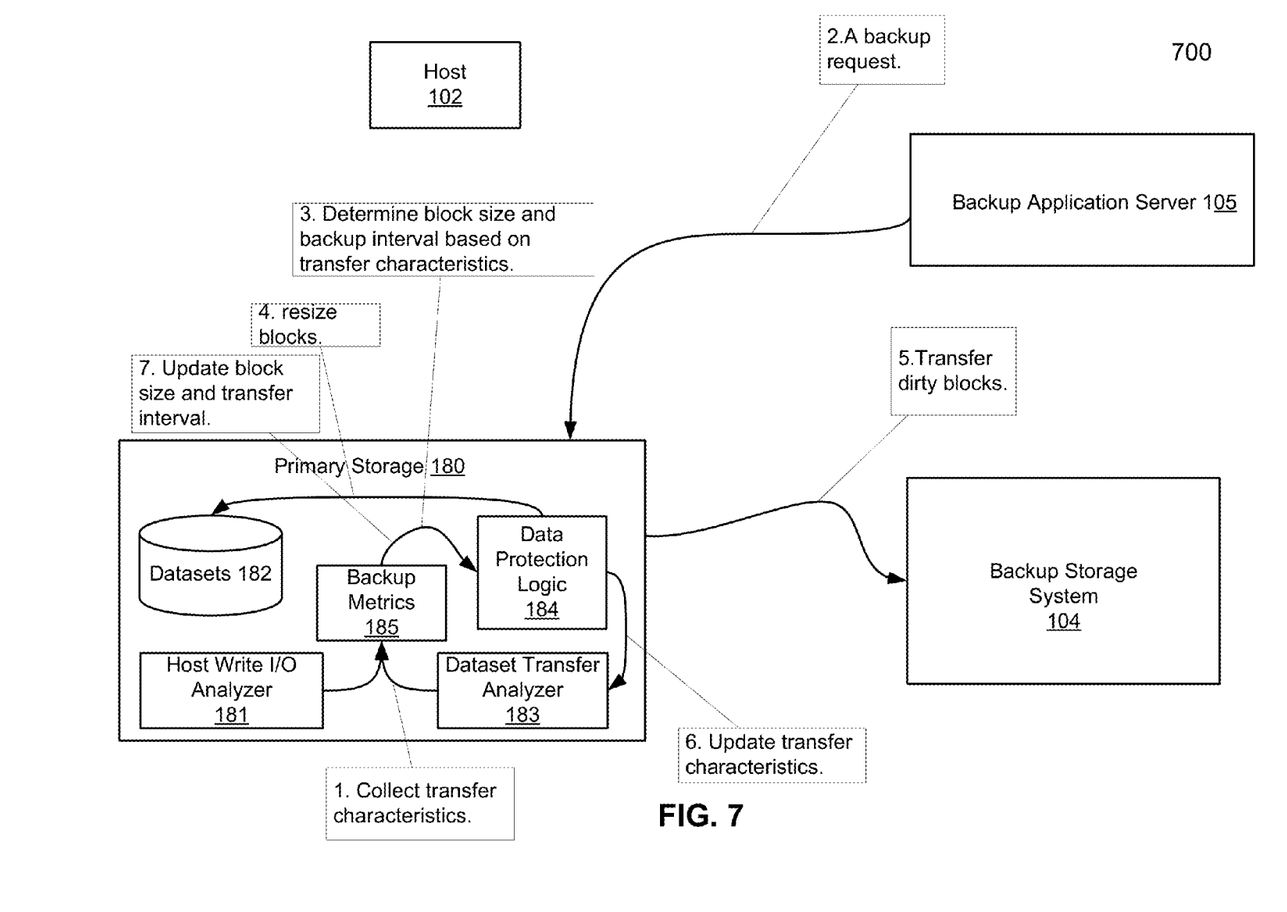
FIG. 7 is a block diagram illustrating an incremental backup process using transfer characteristics according to one embodiment of the invention.

FIG. 7 is a block diagram illustrating an incremental backup process using transfer characteristics according to one embodiment of the invention. A backup interval and a block size for an incremental backup can be adjusted without involving host write I/O pattern analysis. Task boxes 1 to 7 illustrate the order in which operations are performed according to one embodiment of the invention. System 700 is similar to system 500 in FIG. 5 and the same or similar references indicate elements or components having the same or similar functionalities. At task box 1, the process starts at dataset transfer analyzer 183 collecting transfer characteristics from previous transfers to backup metrics 185. At task box 2, a request for a backup is received at primary storage 180. In one embodiment, the request comes from a user directly through a user interface. In another embodiment, the request comes from secondary storage system 104 or primary storage 180 itself based on a backup schedule. Note in some embodiments, the user may request a full backup or an incremental backup, and primary storage 180 decides whether full datasets or changed datasets only are transferred (e.g., primary storage 180 may decide to transfer changed datasets only when the secondary storage has an earlier backup of the datasets and only changed datasets are needed to fully reconstruct the datasets at the secondary storage). At task box 3, backup metrics 185 determines a block size and a backup interval based on the collected transfer characteristics. As discussed herein above, backup metrics 185 considers multiple factors of transfer characteristics in making block size and backup interval determination. After the block size is determined, data protection logic 184 resizes dirty blocks at task box 4. The resizing can be done by merging smaller blocks into larger blocks for example. Note resizing is optional, and in some embodiments, the block size determination does not affect block size in the current backup interval. The dirty blocks are then transferred to secondary storage 104 at task box 5. During or after the dirty data block transfer, transfer characteristics are collected and updated by dataset transfer analyzer 183 at task box 6. Then finally at task box 7, the newly collected transfer characteristics can be used for backup metrics 185 to determine the block size and/or transfer interval for future incremental backups.

Figure 8:
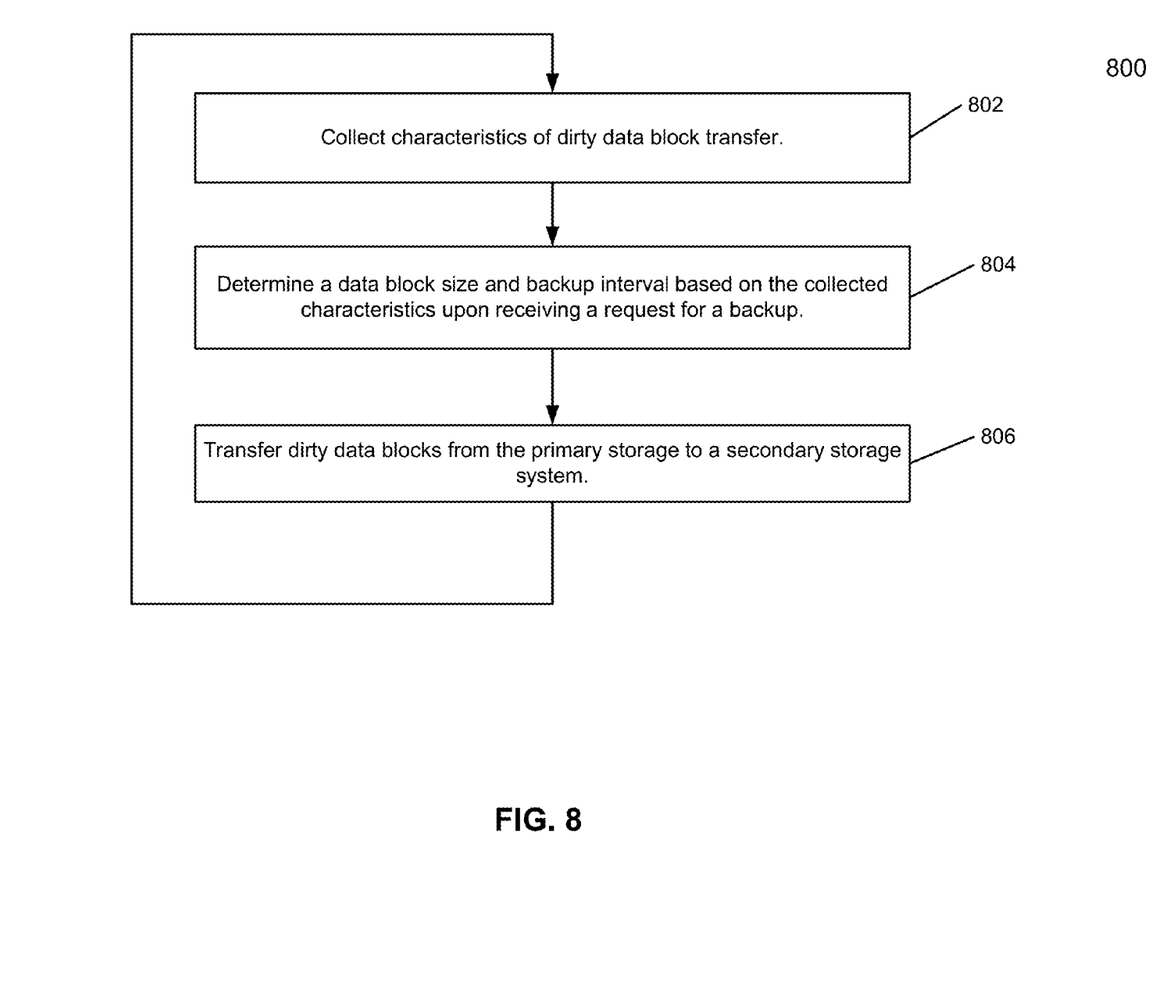
FIG. 8 is a flow diagram illustrating a method of incremental backup according to one embodiment of the invention.

FIG. 8 is a flow diagram illustrating a method of incremental backup according to one embodiment of the invention. The method can be implemented at primary storage 180. At reference 802, the transfer characteristics of dirty data block transfer are collected. The transfer characteristics of dirty data blocks may be from one or more previous backups. At reference 804, a data block size and backup interval is determined based on the collected characteristics of past dirty data block transfer upon receiving a backup request. The backup request may be based on a backup schedule. Then the determined data block size is utilized to determine what block size is required to aggregate dirty sectors. If a new, larger block size should be used, current smaller blocks may be merged to resize to larger blocks. If no new block size is required, the dirty blocks are transferred from the primary storage to a secondary storage system at reference 806. The transfer characteristics of the dirty block transfer at reference 806 are then collected again at reference 802, and the process will continue to adjust into to improve data transfer efficiency.

Figure 9:
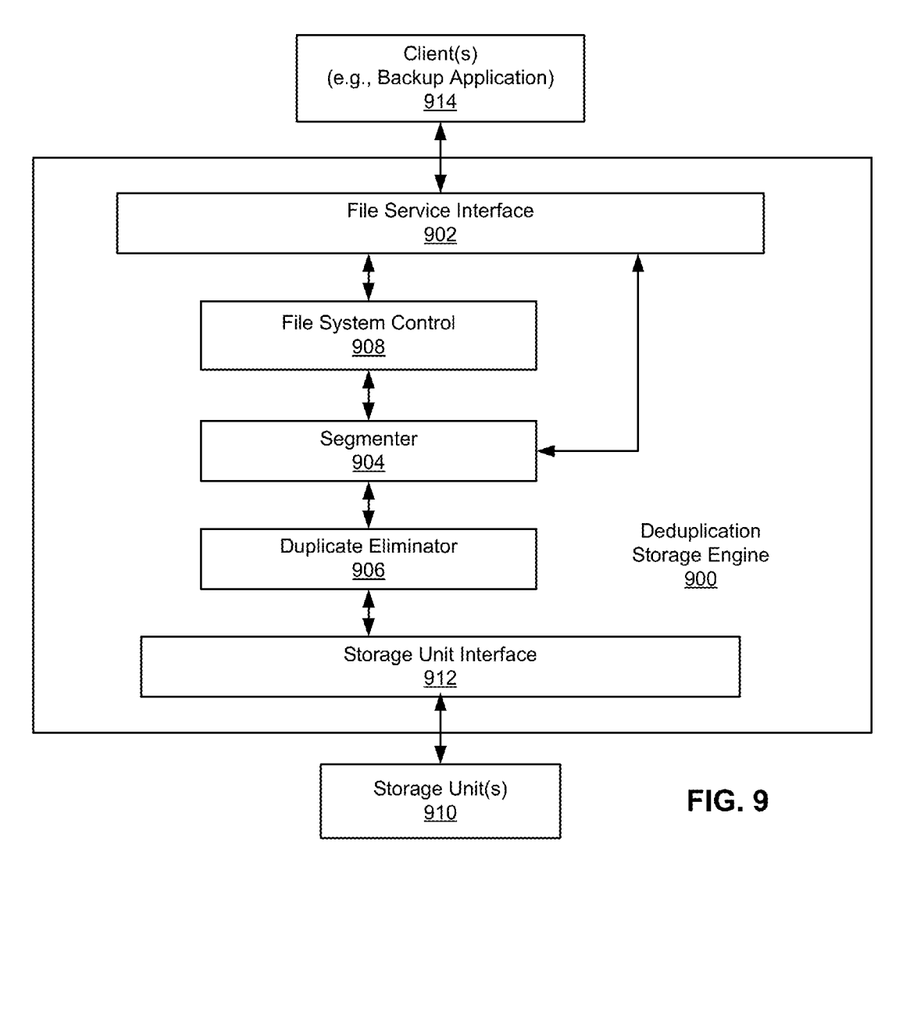
FIG. 9 is a block diagram illustrating a segment storage engine according to one embodiment of the invention.

FIG. 9 is a block diagram illustrating a segment storage engine according to one embodiment of the invention. For example, deduplication storage engine 900 may be implemented as part of a deduplication storage system as described above, such as deduplication storage engine 107 of FIG. 1. Referring to FIG. 9, in one embodiment, deduplication storage engine 900 includes file service interface 902, segmenter 904, duplicate eliminator 906, file system control 908, and storage unit interface 912. Deduplication storage engine 900 receives a file or files (or datasets) via file service interface 902, which may be part of a file system namespace of a file system associated with the deduplication storage engine 900. The file system namespace refers to the way files are identified and organized in the system. An example is to organize the files hierarchically into directories or folders. File service interface 902 supports a variety of protocols, including a network file system (NFS), a common Internet file system (CIFS), and a virtual tape library interface (VTL), etc.

The file(s) is/are processed by segmenter 904 and file system control 908. Segmenter 904 breaks the file(s) into variable-length segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, file system control 908 processes information to indicate the segment(s) association with a file. In some embodiments, a list of fingerprints is used to indicate segment(s) associated with a file. File system control 908 passes segment association information (e.g., representative data such as a fingerprint) to an index (not shown). The index is used to locate stored segments in storage units 910 via storage unit interface 912. Duplicate eliminator 906 identifies whether a newly received segment has already been stored in storage units 910. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 910 that make up the file. Segments are then packed by a container manager (not shown) into one or more storage containers stored in storage units 910. The deduplicated segments may be further compressed using a variation of compression algorithms, such as a Lempel-Ziv algorithm before being stored.

When a file is to be retrieved, file service interface 902 is configured to communicate with file system control 908 to identify appropriate segments stored in storage units 910 via storage unit interface 912. Storage unit interface 912 may be implemented as part of a container manager. File system control 908 communicates with an index (not shown) to locate appropriate segments stored in storage units via storage unit interface 912. Appropriate segments are retrieved from the associated containers via the container manager and are used to construct the requested file. The file is provided via interface 902 in response to the request. In one embodiment, file system control 908 utilizes a tree (e.g., a segment tree) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A computer-implemented method, comprising:
analyzing host write data to determine a host write pattern of a host writing to sectors at a primary storage, including calculating a sequentiality value based on a combination of a number of consecutive writes to sectors and a sector size of the sectors over a number of seeks of the host writing;
determining a data block size and a backup interval of a plurality of data blocks based on at least one of the host write pattern and known characteristics of transferring dirty data blocks of the primary storage, wherein a dirty data block is a data block that includes at least one sector that has been changed from a previous backup, wherein the data block size represents a number of sectors to form a data block, and wherein the data block size and the backup interval are determined based on the sequentiality value; and
transferring dirty data blocks, each having the determined data block size, from the primary storage to a secondary storage as part of a backup according to the determined backup interval.

2. The method of claim 1, wherein the host write pattern is categorized as either sequential, random, or default based on an average size of consecutive host writes to sectors per random seek.

3. The method of claim 2, further comprising resizing data blocks from sectors at the primary storage using the determined data block size after determining the data block size based on the host write pattern.

4. The method of claim 1, further comprising collecting characteristics of transferring dirty data blocks.

5. The method of claim 4, wherein the collected characteristics of transferring dirty data blocks includes at least one of:
a total amount of transferred data within an incremental backup;
a total amount of transferred data within a time period;
a percentage of dirty sectors of the transferred data; and
an amount of input/out on the secondary storage.

6. The method of claim 4, further comprising adjusting the data block size for a future incremental backup based on the collected characteristics of dirty data block transfer.

7. The method of claim 1, wherein the backup is periodically performed based on an incremental backup interval.

8. The method of claim 7, further comprising adjusting the incremental backup interval based on the collected characteristics of the dirty data block transfer and the host write pattern.

9. A non-transitory computer-readable storage medium having instructions stored therein, which when executed by a processor, cause the processor to perform operations, the operations comprising:
analyzing host write data to determine a host write pattern of a host writing to sectors at a primary storage, including calculating a sequentiality value based on a combination of a number of consecutive writes to sectors and a sector size of the sectors over a number of seeks of the host writing;
determining a data block size and a backup interval of a plurality of data blocks based on at least one of the host write pattern and known characteristics of transferring dirty data blocks of the primary storage, wherein a dirty data block is a data block that includes at least one sector that has been changed from a previous backup, wherein the data block size represents a number of sectors to form a data block, and wherein the data block size and the backup interval are determined based on the sequentiality value; and
transferring dirty data blocks, each having the determined data block size, from the primary storage to a secondary storage as part of a backup according to the determined backup interval.

10. The non-transitory computer-readable storage medium of claim 9, wherein the host write pattern is categorized as either sequential, random, or default based on an average size of consecutive host writes to sectors per random seek.

11. The non-transitory computer-readable storage medium of claim 10, wherein the operations further comprise resizing data blocks from sectors at the primary storage using the determined data block size after determining the data block size based on the host write pattern.

12. The non-transitory computer-readable storage medium of claim 9, wherein the operations further comprise collecting characteristics of transferring dirty data blocks.

13. The non-transitory computer-readable storage medium of claim 12, wherein the collected characteristics of transferring dirty data blocks includes at least one of:
a total amount of transferred data within an incremental backup;
a total amount of transferred data within a time period;
a percentage of dirty sectors of the transferred data; and
an amount of input/out on the secondary storage.

14. The non-transitory computer-readable storage medium of claim 12, wherein the operations further comprise adjusting the data block size for a future incremental backup based on the collected characteristics of dirty data block transfer.

15. The non-transitory computer-readable storage medium of claim 9, wherein the backup is periodically performed based on an incremental backup interval.

16. The non-transitory computer-readable storage medium of claim 15, wherein the operations further comprise adjusting the incremental backup interval based on the collected characteristics of the dirty data block transfer and the host write pattern.

17. A primary storage, comprising:
a processor;
a memory coupled to the processor;
a host write input/output analyzer configured to analyze host write data to determine a host write pattern of a host writing to sectors at a primary storage, including calculating a sequentiality value based on a combination of a number of consecutive writes to sectors and a sector size of the sectors over a number of seeks of the host writing; and
a data protection logic configured to determine a data block size and a backup interval of a plurality of data blocks based on at least one of the host write pattern and known characteristics of transferring dirty data blocks of the primary storage, wherein a dirty data block is a data block that includes at least one sector that has been changed from a previous backup, wherein the data block size represents a number of sectors to form a data block, and wherein the data block size and the backup interval are determined based on the sequentiality value,
wherein the data protection logic transfers dirty data blocks, each having the determined data block size, from the primary storage to a secondary storage as part of a backup according to the determined backup interval.

18. The primary storage of claim 17, wherein the host write pattern is categorized as either sequential, random, or default based on an average size of consecutive host writes to sectors per random seek.

19. The primary storage of claim 18, wherein the data protection logic is further configured to resize data blocks from sectors at the primary storage using the determined data block size after determining the data block size based on the host write pattern.

20. The primary storage of claim 17, further comprising a dataset transfer analyzer configured to collect characteristics of transferring dirty data blocks.

21. The primary storage of claim 20, wherein the collected characteristics of transferring dirty data blocks includes at least one of:
  a total amount of transferred data within an incremental backup;
  a total amount of transferred data within a time period;
  a percentage of dirty sectors of the transferred data; and
  an amount of input/out on the secondary storage.

22. The primary storage of claim 20, wherein the data protection logic is further configured to adjust the data block size for a future incremental backup based on the collected characteristics of dirty data block transfer.

23. The primary storage of claim 17, wherein the backup is periodically performed based on an incremental backup interval.

24. The primary storage of claim 23, wherein the data protection logic is further configured to adjust the incremental backup interval based on the collected characteristics of the dirty data block transfer and the host write pattern.

* * * * *